United States Patent [19]

Messer et al.

[11] 4,450,012

[45] May 22, 1984

[54] FLOCCULATION-RESISTANT, MIXED PHASE PIGMENTS HAVING A RUTILE STRUCTURE, PROCESS FOR THEIR PREPARATION, AND THEIR USE

[75] Inventors: Dieter Messer; Volker Wilhelm; Robert Endres, all of Cologne; Heinrich Heine, Krefeld, all of Fed. Rep. of Germany

[73] Assignee: Bayer Aktiengesellschaft, Leverkusen, Fed. Rep. of Germany

[21] Appl. No.: 415,992

[22] Filed: Sep. 8, 1982

[30] Foreign Application Priority Data

Sep. 19, 1981 [DE] Fed. Rep. of Germany ....... 3137384

[51] Int. Cl.³ .......................... C09C 1/36; C09C 1/00
[52] U.S. Cl. .................................. 106/300; 106/308 B
[58] Field of Search ............................ 106/308 B, 300

[56] References Cited

U.S. PATENT DOCUMENTS

| | | | |
|---|---|---|---|
| 3,022,186 | 2/1962 | Hund | 106/300 |
| 3,523,810 | 8/1970 | Swank | 106/308 B |
| 3,941,603 | 3/1976 | Schmidt | 106/308 B |
| 4,115,144 | 9/1978 | Chambers et al. | 106/308 B |
| 4,222,789 | 9/1980 | Jacobson | 106/300 |

FOREIGN PATENT DOCUMENTS

| | | | |
|---|---|---|---|
| 990457 | 6/1976 | Canada | 106/300 |
| 2936746 | 3/1981 | Fed. Rep. of Germany | |
| 1368601 | 10/1974 | United Kingdom | 106/300 |
| 2088348A | 6/1982 | United Kingdom | 106/300 |

*Primary Examiner*—Helen M. McCarthy
*Attorney, Agent, or Firm*—Connolly and Hutz

[57] ABSTRACT

Coated rutile mixed phase pigments comprise a mixed phase rutile pigment having a first coating of an oxide or hydrated oxide of titanium, zirconium, tin or a mixture thereof and a subsequent coating of an oxide or hydroxide of aluminum, and those pigments exhibit an improved tendency against flocculation in lacquers hardened with acid catalysts.

9 Claims, No Drawings

FLOCCULATION-RESISTANT, MIXED PHASE PIGMENTS HAVING A RUTILE STRUCTURE, PROCESS FOR THEIR PREPARATION, AND THEIR USE

The present invention relates to rutile, mixed phase pigments. Those pigments have a coating of oxides and/or hydroxides of tetravalent titanium and/or zirconium and/or tin and a final coating of oxides and/or hydroxides of aluminium. The invention also relates to processes for the preparation of these pigments and to their use.

BACKGROUND OF THE INVENTION

Mixed phase pigments having a rutile structure have long been known. By incorporating metal oxides such as NiO, $Cr_2O_3$, CuO or MnO with $Sb_2O_5$, $Nb_2O_5$ or $WO_3$ in the crystal matrix of titanium dioxide, it is possible to prepare mixed oxides with a rutile structure which have colors extending over wide ranges of the visible spectrum.

If the valency of the color producing metal ion incorporated in the structure is other than 4, another metal oxide with a different valency is also incorporated in the crystal lattice to correct the valency so that the metal oxides incorporated in the lattice satisfy the following condition:

$$aA^n + O_{\frac{n}{2}} + bB^m + O_{\frac{m}{2}} = (a+b)\left(A_{\frac{a}{a+b}} B_{\frac{b}{a+b}}\right) O_2$$

It follows that a and b conform to the equation $$a \cdot n + b \cdot m = 4(a+b)$$

wherein

A is a metal capable of being incorporated, e.g. $Cr^{3+}$, $Ni^{2+}$, $Cu^{2+}$, $Mn^{3+}$;

B is another metal capable of being incorporated, e.g., $Sb^{5+}$, $Nb^{5+}$, $W^{6+}$;

O is oxygen atom;

n is the valency of the incorporated metal A, and is 2 or 3;

m is the valency of the incorporated metal B, and is 5 or 6; and a and b are small whole numbers.

These proportions are generally fairly closely observed but rutile mixed phase pigments are known in which the proportions deviate more widely from this idealized composition.

Rutile mixed phase pigments of nickel and chromium have achieved considerable technical importance. When nickel oxide and chromium oxide are incorporated in $TiO_2$ as color producing oxides, their valencies are compensated by the incorporation of other metal oxides of higher valency, particularly oxides of antimony but also of niobium and/or tungsten (U.S. Pat. Nos. 1,945,809, 2,251,829, 2,257,278 and 3,832,205).

Pigments of this kind are prepared by annealing anatase and/or hydrates of titanium dioxide with metal oxides which are capable of being incorporated into the crystal lattice or with precursors of such metal oxides (U.S. Pat. No. 3,022,186).

The products of annealing are usually suspended in water and the pigments are then obtained in their final form normally by grinding (preferably wet grinding) to the required particle size followed by washing, drying and grinding to break up any agglomerates.

The pH of the products obtained (according to DIN 53 200) varies from slightly alkaline to slightly acid according to the particular method used for working up.

In lacquers hardened by acid catalysis, rutile mixed phase pigments in the untreated form tend to undergo substantial flocculation which, as is well known, leads to a color change.

Surface-treatments of rutile mixed phase pigments using inorganic agents are known from the literature. For example, according to German Offenlegungsschrift No. 2 936 746, the untreated pigments are first treated with a surface active agent and then a single layer of metal hydroxide of the elements Ti, Zr, Sn or Al is applied.

Although rutile mixed phase pigments which have been given a single layered inorganic surface-treatment show improved dispersibility, their tendency to flocculate in lacquers hardened with the aid of acid catalysts is not substantially improved.

DETAILED DESCRIPTION OF THE INVENTION

It is an object of the present invention to provide novel rutile mixed phase pigments which do not have the disadvantage mentioned above.

Pigments which are eminently suitable for fulfilling these requirements have now surprisingly been found.

These pigments are rutile mixed phase pigments having a first coating of oxides and/or hydroxides of tetravalent titanium and/or zirconium and/or tin and a final coating of oxides and/or hydroxides of aluminium.

Exceptionally advantageous properties are found in those rutile mixed phase pigments in which the coating of oxides and/or hydroxides of titanium and/or zirconium and/or tin amounts to from 0.5 to 20% by weight, preferably from 1 to 10% by weight, based on the dry pigment, and the coating of oxides and/or hydroxides of aluminium amounts to from 0.5 to 20% by weight, preferably from 1 to 10% by weight, based on the dry pigment.

The fluocculation effect of the rutile mixed phase pigments according to the invention is only very slight.

These improved pigments contain pairs of layers of, for example, $TiO_2/Al_2O_3$, $ZrO_2/Al_2O_3$, $SnO_2/Al_2O_3$ or $Al_2O_3$ on any mixtures of $TiO_2$, $ZrO_2$ and $SnO_2$. In the present application, the terms $ZrO_2$, $SnO_2$, $TiO_2$ and $Al_2O_3$ are used to include also the hydroxides and their various stages of dehydration (e.g., hydrated oxides) without their exact composition and structure being known.

The pigments according to the invention may be prepared by first precipitating hydrated oxides of titanium and/or zirconium and/or tin or annealed and ground rutile mixed phase pigments in an aqueous suspension and then precipitating the hydroxides of aluminium on the once coated rutile followed by washing and drying the pigments.

These two successive precipitations may thus be carried out directly in a suspension obtained from the rutile manufacturing process after annealing and wet grinding.

Precipitation of the oxides and/or hydroxides of the individual metals is carried out within the appropriate pH range for the particular metal, which in the case of aluminium is in the range of 5 to 9.

The tetravalent titanium, zirconium and/or tin metal ions as well as the aluminium metal ions are supplied in the form of water-soluble salts, such as sulphate.

Thus, rutile coating may be carried out by mixing an aqueous rutile suspension with titanyl sulphate solution, precipitating hydrated $TiO_2$ by the addition of NaOH and then mixing the suspension with an aluminium sulphate solution, and precipitating the aluminium as hydrated oxide by the further addition of sodium hydroxide solution at pH 5 to 9.

Coating with hydrated $ZrO_2$ is carried out analogously, using a zirconium sulphate solution.

The coating may be carried out by first introducing the rutile suspension into the reaction vessel with stirring at room temperature or at an elevated temperature up to about 80° C. and then adding an acid solution of the tetravalent metal ions. Alternatively, the pigment suspension may be added to the acid solution with stirring.

Another method involves precipitating the hydrated oxides of the tetravalent metals by the addition of an alkali metal aluminate solution.

For reasons of a satisfactory volume/time yield, the rutile concentration would hardly be less than 10% by weight in the aqueous suspension. Higher concentrations would generally be used provided the suspension remains stirrable, and in certain cases (large pigment particles) the concentration may be up to 60% by weight. The proportion of oxides, $MO_2$, of tetravalent metals should amount to a total of from 0.5 to 20% by weight, preferably from 1 to 10% by weight of $MO_2$ (M is Ti, Zr or Sn), based on the dry pigment.

Precipitation of $MO_2$ is followed by the deposition of $Al_2O_3$ by the addition of an aluminium salt solution to the pigment suspension. If, for example, an aluminium sulphate solution is used, then the pH of the contents of the reaction vessel should be below 4 in order to prevent partial hydrolysis during addition of the aluminium salt.

If, on the other hand, an alkali metal aluminate solution is used, the pH of the reaction medium should be in the highly alkaline region. In both cases, the aluminium oxide is precipitated in a pH range of from 5 to 9, preferably from 7 to 8.5.

The pH of the completed suspension should be in the region of 7 to 10, preferably 7.5 to 8.5. If the aqueous solutions contain insufficient quantities of acid or alkali, an acid or base is added to adjust the final pH.

The efficiency of stabilization against flocculation increases with increasing quantities of $MO_2$ and $Al_2O_3$.

For practical reasons, however, the quantities used would not be more than is necessary for the desired stabilization effect.

After successive precipitations of metal oxides, the suspension is stirred for a further period of from 15 minutes to 2 hours, during which the precipitated layers undergo ageing which improves filtration.

The process according to the invention results in rutile mixed phase pigments which are resistant to flocculation in lacquers hardened by acid catalysis based, for example, on melamine resins, acrylates, alkyd resins, maleic acid resins, phenol resins or epoxide resins, polyesters and polyurethanes, in particular baking lacquers and coil-coat lacquers. The pigments according to the invention may, of course, also be used in systems where flocculation-resistance is not required, e.g. for the pigmentation of plastics.

The flocculation-resistant pigments of this invention can be used in amounts similar to known rutile pigments to achieve the pigmenting effect in lacquers and plastics.

A suitable test method for assessing the resistance to flocculation and hence color-stability is the rub-out test, which is described below.

The rub-out effect is a color change produced by rubbing a layer which is in the process of drying and comparing this with the color in an area which has not been rubbed. The effect occurs when the individual pigment particles no longer have a statistically uniform distribution in the liquid layer. This may be due to local concentration of pigments, such as occurs in flocculation and in settling, or it may be due to the separation of different kinds of pigment particles as they float upwards or outwards. Rubbing reestablishes the uniform distribution of the individual pigment particles. This distribution is generally preserved until final drying is achieved if the rub-out test has been carried out at the correct moment.

In rutile mixed phase pigments, this rub-out effect can be demonstrated in various binders, both in the pure pigment tone and in mixtures. The magnitude of the effect can be determined colorimetrically from the color distance according to DIN 61 74 between the rubbed and the unrubbed surface and constitutes a measure of the intensity of flocculation.

In the present examples, the rub-out test was carried out on the pure tones of the lacquer coats.

EXAMPLE 1

Basic chromium sulphate solution corresponding to 0.03 mol of $Cr_2O_3$, 0.03 mol of $Sb_2O_3$ and 5% of rutile nuclei, based on the quantity of $TiO_2$ hydrate used, is added to 1 mol of $TiO_2$ (in the form of a 30% suspension of $TiO_2$ hydrate. Chromium hydroxide is precipitated from this suspension by sodium hydroxide solution. The suspension is concentrated to a solid content of about 50% and annealed for one hour at 1000° C. The crude pigment is then worked up by suspending it in water and grinding it to a fine pigment in ball and sand mills. The resulting suspension is used for further treatment.

COMPARATIVE EXAMPLE 1 (V1)

The pigment suspension obtained according to Example 1 is filtered off, washed until salt-free, dried and deagglomerated in a pin mill. The orange yellow pigment obtained is worked up in a baking lacquer either with or without the addition of acid, and the rub-out value is determined in each case. The values for the rutile pigment of Example 1 and for coated pigments based on Example 1 are shown in Table 1.

Baking lacquer without addition of acid

A mixture of 29.6 g of Alkydal R35 (a Trade Product of BAYER AG for an alkyd resin) 30% in xylene, and 47.05 g of pigment is prepared in a "Red Devil" vibrator (operating time one hour).

10 g of the triturate are mixed with 18.2 g of a top coat lacquer based on Alkydal R35 and Marprenal MR 800 (a Trade Product of Casella AG for a melamin resin) corresponding to a PVK of 12% and the product is applied to a polyester foil to form a layer 200 μm in thickness. The rub-out is made after the layer has been exposed to air for 10 minutes, and the lacquer is then stoved for 30 minutes at 120° C.

Baking lacquer with added acid

Trituration is carried out as described above. Formulation of top coat lacquer.
10 g of pigment triturate
18.2 g of coat lacquer (as described above)
1.13 g of monobutylphosphate (20% in ethyl glycol)

The lacquer is applied to the polyester foil to form a layer 200 μm in thickness and is then left exposed in air for 15 minutes. After the rub-out, the lacquer is hardened for 30 minutes at 80° C.

Rub-out test

After the required time of exposure to air, the colorimetric test is carried out by uniformly rubbing a sufficiently large area of the lacquer surface (normally half the total area applied) with a smooth spactula in one longitudinal direction until the rubbed surface appears uniform in color. Care should be taken to ensure that the rubbed layer continues to form a uniform covering. The surface is then stoved for the prescribed time.

Assessment

The Hunter-Lab coordinates of the rubbed and unrubbed surfaces are measured and the color distance $\Delta E^*$ according to DIN 6174 (colorimetric determination of color distances of body colors according to CIELAB formula) are determined according to the following equation:

$$\Delta E^* ab = \sqrt{(\Delta L^*)^2 + (\Delta a^*)^2 + (\Delta b^*)^2}$$

EXAMPLE 2

A titanyl sulphate solution (about 120 g of $TiO_2$ per l) corresponding to 2% by weight of $TiO_2$, based on the dry pigment, is introduced into a stirrer vessel at room temperature. The pigment suspension obtained according to Example 1 is then added in a quantity corresponding to a solids concentration of 300 g/l and the resulting mixture is stirred for one hour.

The pH becomes established at 1.5. It is adjusted to pH 7 with half concentrated NaOH and the reaction mixture is stirred for one hour, filtered, washed until salt-free (conductivity of filtrate ~1 mS) and dried.

EXAMPLE 3

$Zr(SO_4)_2 \cdot 4H_2O$ is dissolved in 10% $H_2SO_4$ in a quantity corresponding to 2% by weight of $ZrO_2$, based on the dry pigment, and the pigment suspension is added with stirring as in Example 2 and stirring is continued for one hour. The pH of 1.3 is adjusted to pH 7 with half concentrated NaOH, the mixture is stirred for one hour, and the pigment is filtered off, washed salt-free and dried.

EXAMPLE 4

$Al_2(SO_4)_3 \cdot 18H_2O$ is dissolved in 10% $H_2SO_4$ in a quantity corresponding to 2% by weight of $Al_2O_3$, based on the dry pigment. The pigment suspension is added with stirring as described in Example 2 and the resulting mixture is stirred for one hour. The pH of 1.5 is adjusted to 8.0 with half concentrated NaOH and the pigment is worked up as described above.

EXAMPLE 5

A 50% solution of $H_2SO_4$ is introduced into a stirrer vessel together with a titanyl sulphate solution (approximately 120 g of $TiO_2/l$) in a quantity corresponding to 2% by weight of $TiO_2$, based on the dry pigment. The pigment suspension obtained according to Example 1 is run into the contents of the vessel at room temperature and the mixture is stirred at pH 1 for about one hour at room temperature. The pH is then adjusted to 8.5 with half concentrated NaOH and the resulting mixture is stirred for ½ hour. The pH is then adjusted to 3.5 with half concentrated $H_2SO_4$ and a quantity of acidic aluminium sulphate solution corresponding to 4% by weight of $Al_2O_3$, based on the dry pigment, is added and the mixture is stirred for ½ hour at pH 2 to 3, adjusted to pH 8.5 with half concentrated NaOH and again stirred for ½ hour.

The pigment is then worked up as described above.

EXAMPLE 6

A 50% solution of sulphuric acid is introduced into a stirrer vessel. A quantity of $Zr(SO_4)_2 \cdot 4H_2O$ corresponding to 2% by weight of $ZrO_2$, based on the dry pigment, is added and dissolved. The pigment suspension obtained according to Example 1 is then run into the contents of the stirrer vessel at about 60° C. The resulting mixture is stirred at pH 1 for about one hour at room temperature. The pH is then adjusted to 8.5 with half concentrated NaOH and the mixture is stirred for ½ hour. Half concentrated $H_2SO_4$ is added to adjust the pH to 3.5 and acidic aluminium sulphate solution is added in a quantity corresponding to 2% by weight of $Al_2O_3$, based on the dry pigment. The mixture is stirred for ½ hour at a pH from 2 to 3, adjusted to pH 8.5 with half concentrated NaOH and again stirred for ½ hour. The pigment is then worked up as described above.

EXAMPLE 7

Surface-treatment is carried out by the same method as described in Example 6 except that precipitation is carried out at room temperature and the quantities of metal sulphate solutions used correspond to 3% $ZrO_2$ and 5% $Al_2O_3$.

EXAMPLE 8

A solution of $SnCl_4$ in concentrated hydrochloric acid corresponding to 2% by weight of $SnO_2$, based on the dry pigment, is introduced into a stirrer vessel at room temperature and the pigment suspension of Example 1 is run in (pH 0.9). The suspension is adjusted to 8.5 with concentrated ammonia, stirred for ½ hour and adjusted to pH 3.5 with 10% $H_2SO_4$. An acidic aluminium sulphate solution is then added in a quantity corresponding to 4% by weight of $Al_2O_3$, based on the dry pigment (pH 2.0), the pH is adjusted to 8.5 with half concentrated NaOH, and the mixture is stirred for ½ hour at room temperature. The pigment is then worked up as described above.

EXAMPLe 9

5 mol-% of antimony oxide, 7 mol-% of nickel oxide and 5% by weight of rutile nuclei (based on the quantity of $TiO_2$ used) are added to 1 mol of $TiO_2$ (in the form of a 30% aqueous solution of the hydrate), and the components are vigorously mixed. After the suspension concentrated to about 50% has been annealed at 900° C., the crude pigment is suspended in water and ground to fine a pigment in ball and sand mills. The suspension obtained is used for further treatment.

COMPARISON EXAMPLE 2 (V2)

The pigment suspension prepared according to Example 9 is filtered off, washed salt-free, dried and deagglomerated in a pin mill. The brilliant lemon yellow rutile pigment is worked up in a baking lacquer with and without the addition of acid as in Comparison Example VI, as are also the coated pigments, and the "rub-out" is determined as described in that Example (Table 1).

EXAMPLE 10

A titanyl sulphate solution (about 120 g of $TiO_2/l$) in a quantity corresponding to 2% by weight of $TiO_2$, based on the dry pigment, is introduced into a stirrer vessel at room temperature and the pigment suspension (about 400 g solid substance/l) prepared according to Example 9 is added with stirring (pH 0.9). After the addition of half concentrated sodium hydroxide solution to adjust to pH 8.8, the mixture is stirred for ½ hour and then adjusted to pH 3.5 with half concentrated $H_2SO_4$. A solution of acidic aluminium sulphate in a quantity corresponding to 4% by weight of $Al_2O_3$, based on the dry pigment, is run into the suspension at room temperature (pH 2.2), and the pH is adjusted to 8.5. The mixture is subsequently stirred for ½ hour and the pigment is then washed until salt-free (conductivity of the filtrate below 1 mS), dried and deagglomerated in a pin mill.

EXAMPLE 11

$Zr(SO_4)_2.4H_2O$ dissolved in 10% $H_2SO_4$ in a quantity corresponding to 2% by weight of $ZrO_2$, based on the dry pigment, is introduced into a stirrer vessel and the pigment suspension prepared according to Example 9 is added (pH 0.8). After the addition of half concentrated sodium hydroxide solution, the mixture is worked up as described in Example 10, corresponding to the precipitation of 4% by weight of $Al_2O_3$, based on the dry pigment.

TABLE I

| | "rub-out" of baking lacquer | |
|---|---|---|
| Example | without acid (E*) | with acid (E*) |
| V 1 | 0.65 | 4.38 |
| 2 | 0.63 | 3.71 |
| 3 | 0.65 | 3.57 |
| 4 | 0.60 | 3.10 |
| 5 | 0.20 | 0.30 |
| 6 | 0.34 | 0.53 |
| 7 | 0.18 | 0.35 |
| 8 | 0.40 | 0.81 |
| V 2 | 0.44 | 2.55 |
| 10 | 0.20 | 0.49 |
| 11 | 0.16 | 0.52 |

What is claimed is:

1. Coated rutile mixed phase pigments comprising a mixed phase rutile pigment having a first coating of an oxide or hydrated oxide of a metal selected from tetravalent titanium, zirconium, tin and mixtures thereof, and a final coating of an oxide or hydrated oxide of aluminium.

2. Coated rutile mixed phase pigments according to claim 1 wherein said first coating amounts to from 0.5 to 20% by weight, based on the dry pigment, and said final coating amounts to from 0.5 to 20% by weight, based on the dry pigment.

3. Coated rutile mixed phase pigments according to claim 2 wherein said first coating amounts to 1 to 10% by weight, based on the dry pigment, and said final coating amounts to 1 to 10% by weight, based on the dry pigment.

4. The process for preparation of coated rutile mixed phase pigments according to claim 1 comprising:
    (a) first precipitating a layer of an oxide or hydrated oxide of titanium, zirconium, tin or mixtures thereof onto annealed and ground mixed phase rutile pigment in an aqueous suspension;
    (b) subsequently precipitating a final layer of an oxide or hydrated oxide of aluminium on the once coated pigment from step (a); and
    (c) washing and drying the twice coated rutile pigment.

5. The process according to claim 4 wherein the mixed phase rutile pigment concentration in the aqueous suspension is from 10 to 60% by weight and each of the two precipitations is conducted until each of the two layers respectively amount to 0.5 to 20% by weight of the dry pigment.

6. The process according to claim 4 or claim 5 wherein the oxide or hydrated oxide of titanium, zirconium or tin is precipitated from an acidic solution of a water soluble salt and the final layer of aluminum oxide or hydrated oxide is precipitated from an aluminium sulfate solution.

7. The process according to claim 4 or claim 5 wherein an aqueous suspension of mixed phase rutile pigment is mixed with a titanyl sulfate solution; the ph of the suspension is adjusted with sodium hydroxide to precipitate hydrated titanium dioxide onto the rutile; the suspension is then mixed with an aluminium sulfate solution and the pH is adjusted to from 5 to 9 to precipitate hydrated aluminum oxide as a final layer.

8. The process according to claim 4 or claim 5 wherein an aqueous suspension of mixed phase rutile pigment is mixed with a zirconium sulfate solution; the pH of the suspension is adjusted with sodium hydroxide to precipitate hydrated zirconium dioxide onto the rutile pigment; the suspension is then mixed with an aluminium sulfate solution and the pH is adjusted to from 5 to 9 to precipitate hydrated aluminum oxide as a final layer.

9. In the process of pigmenting plastics and lacquers by adding a color-producing amount of a pigment, the improvement comprises said pigment being a coated rutile mixed phase pigment according to claim 1.

* * * * *